(12) United States Patent
Loof et al.

(10) Patent No.: US 10,001,168 B2
(45) Date of Patent: Jun. 19, 2018

(54) SPHERICAL ROLLER BEARING ARRANGEMENT

(71) Applicants: Marcus Loof, Nol (SE); Peter James, Mölndal (SE); Lars Stigsjöö, Angered (SE); Emma Bjorkman, Trollhättan (SE)

(72) Inventors: Marcus Loof, Nol (SE); Peter James, Mölndal (SE); Lars Stigsjöö, Angered (SE); Emma Bjorkman, Trollhättan (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days. days.

(21) Appl. No.: 15/092,006

(22) Filed: Apr. 6, 2016

(65) Prior Publication Data

US 2016/0298688 A1    Oct. 13, 2016

(30) Foreign Application Priority Data

Apr. 9, 2015   (SE) ........................................ 1550417

(51) Int. Cl.
 *F16C 33/48*   (2006.01)
 *F16C 23/08*   (2006.01)
 (Continued)

(52) U.S. Cl.
 CPC ............ *F16C 33/48* (2013.01); *F16C 23/086* (2013.01); *F16C 19/38* (2013.01); *F16C 33/49* (2013.01);
 (Continued)

(58) Field of Classification Search
 CPC .......... F16C 19/38; F16C 33/48; F16C 33/49; F16C 33/583; F16C 23/082; F16C 23/083; F16C 23/086
 See application file for complete search history.

(56) References Cited

U.S. PATENT DOCUMENTS 4,280,743 A * 7/1981 Fernlund ............... F16C 23/086
 384/571
5,145,267 A * 9/1992 Takata .................. F16C 23/086
 384/558

(Continued)

FOREIGN PATENT DOCUMENTS

JP   2007-298080   * 11/2007
JP   2010-190241   *  9/2010

*Primary Examiner* — James Pilkington
(74) *Attorney, Agent, or Firm* — Bryan Peckjian; SKF USA Inc. Patent Dept.

(57) ABSTRACT

A bearing arrangement for low speed rotating machinery includes a shaft and at least one double row spherical roller bearing supporting the shaft. The bearing has an inner ring providing a radially outer circumferential surface having a first and a second inner raceway and an annular portion separating the first and second inner raceway in an axial direction. An outer ring provides a radially inner circumferential surface with at least one outer raceway. Spherical rollers are located in a first and a second roller row, the first and second roller row disposed between the at least one outer raceway and the first and second respective inner raceway. A cage has a central portion located between the roller rows. The central portion provides a radially inner circumferential surface and axial protrusions to separate at least two rollers in one of the first and second rollers rows.

12 Claims, 6 Drawing Sheets

(51) Int. Cl.
  *F16C 33/49* (2006.01)
  *F16C 33/66* (2006.01)
  *F16C 19/38* (2006.01)

(52) U.S. Cl.
  CPC ........ *F16C 33/667* (2013.01); *F16C 33/6625* (2013.01)

(56) References Cited

U.S. PATENT DOCUMENTS

| | | | | |
|---|---|---|---|---|
| 6,152,606 | A * | 11/2000 | Shirosaki | F16C 23/086 384/475 |
| 6,338,281 | B1 * | 1/2002 | El-Ibiary | G01L 5/0019 73/862.381 |
| 7,422,373 | B2 * | 9/2008 | Cook | F16C 19/38 384/486 |
| 8,075,196 | B2 * | 12/2011 | Burner | F16C 19/386 384/206 |
| 8,540,433 | B2 * | 9/2013 | Wendeberg | F16C 35/073 384/510 |

* cited by examiner

*Prior Art*

*Fig. 4A*

*Prior Art*

*Fig. 4B*

SPHERICAL ROLLER BEARING ARRANGEMENT

CROSS-REVERENCE TO RELATED APPLICATIONS

This application claims priority to Swedish patent application no. 1550417-8 filed on Apr. 9, 2015, the contents of which are fully incorporated herein by reference.

TECHNICAL FIELD

The invention regards a bearing arrangement for a low speed rotating machinery. The bearing arrangement provides a shaft and at least one double row spherical roller bearing.

BACKGROUND OF THE INVENTION

Bearing arrangements providing double row spherical roller bearings (SRB) are used in applications where there is various load and misalignment to the shaft. In these bearing arrangements the rings can move in relation to each other, and the rollers will adapt their axial position along the raceways to correct for the misalignments. The spherical roller bearings in these bearing arrangements have means to separate the rollers in the two roller rows from each other, often either by an inner ring mid-flange or a separate steering guide ring. These means affect the roller position in a forced manner, which prevents the rollers from taking up load optimally. In the case of a mid-flange it inflicts friction and strain to the rings as it pushes the rollers on their end face, and also induces heat generation which leads to lubricant degeneration and other heat generated damage to the bearing. In the case of a separate guide ring in between the rollers, one row of rolling elements will push the guide ring which in turn will affect the other row of rollers, preventing them from being steered optimally, for instance due to the different shape and friction coefficients of the rings and rollers. This will also inflict more friction, heat generation and cause damages to the raceways, such as skidding and smearing. Therefore there is a need to find a solution that can allow increased steering of the rollers by the raceways without them being forced into position by other means.

Figure 4A:
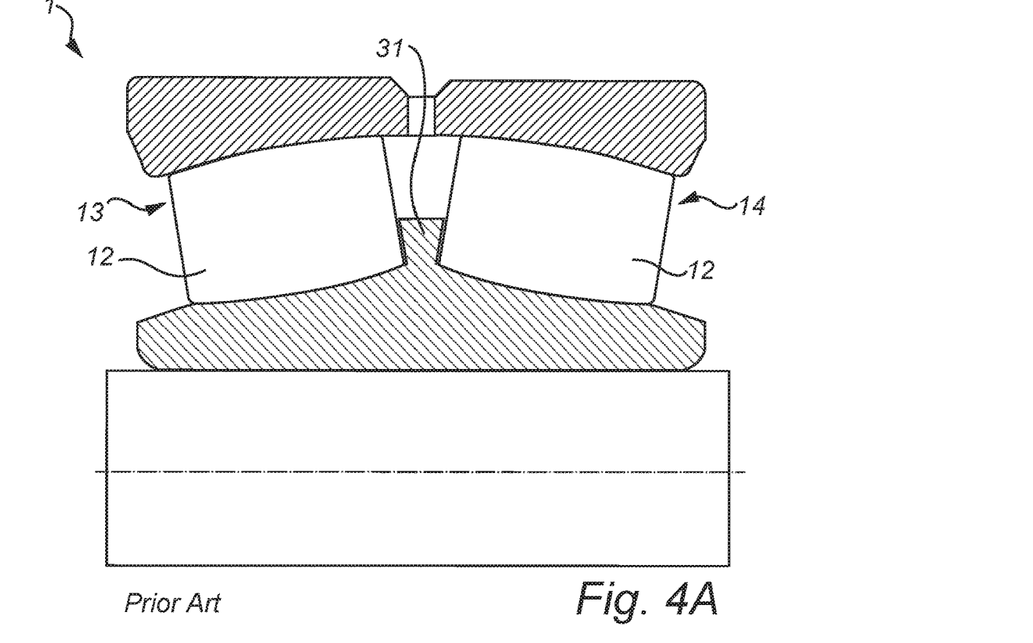
FIG. 4A shows a cross section of a bearing arrangement according to prior art.

FIG. 4A shows a traditional bearing arrangement 1 according to prior art with an inner ring mid flange 31 to separate the rollers 12 in the first and second roller rows 13, 14.

Figure 4B:
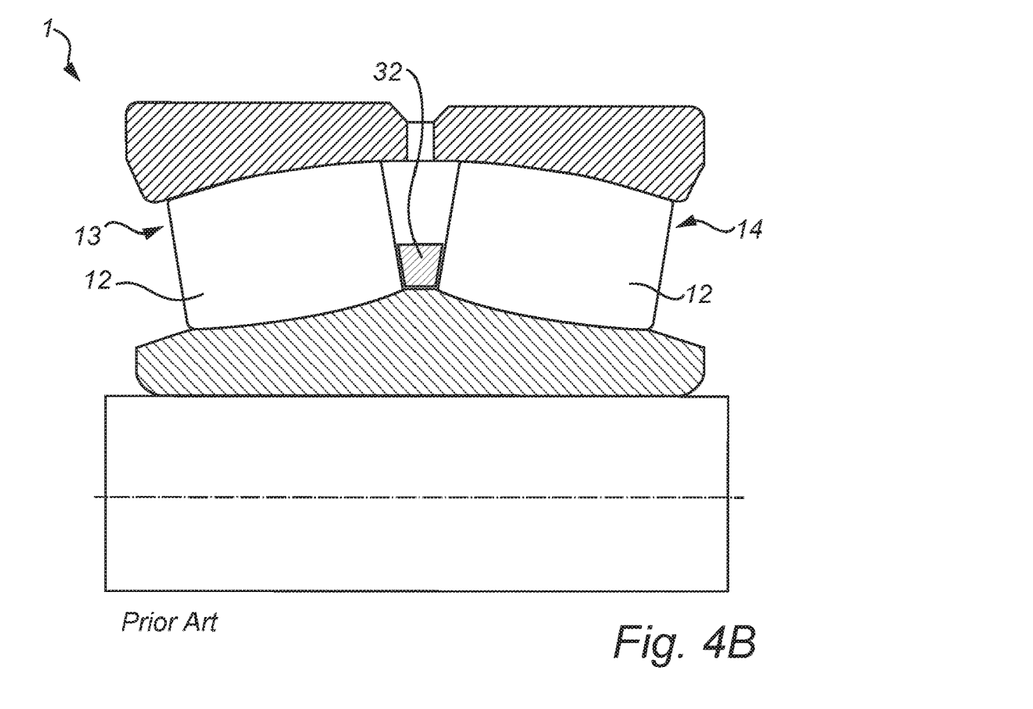
FIG. 4B shows a cross section of a bearing arrangement according to prior art.

FIG. 4B shows a traditional bearing arrangement 1 according to prior art with a steering guide ring 32 to separate the rollers 12 in the first and second roller rows 13, 14.

SUMMARY OF THE INVENTION

An object of the invention is to alleviate at least some of the above identified needs.

An object of the invention has been achieved by providing a bearing arrangement for a low speed rotating machinery arrangement providing a shaft and at least one double row spherical roller bearing. The bearing presents an inner ring having a radially outer circumferential surface. The outer circumferential surface presents a first and a second inner raceway and an annular portion separating the first and second inner raceway in an axial direction. Further the bearing presents an outer ring having a radially inner circumferential surface. The radially inner circumferential surface presents an at least one outer raceway. Spherical rollers are arranged in a first and a second roller row. The first and second roller rows are being interposed between the at least one outer raceway of the radially inner circumferential surface of the outer ring, and the first and second respective inner raceway of the radially outer circumferential surface of the inner ring.

Further the bearing presents at least one cage providing a central portion located in between the roller rows. By at least one cage is meant that the cage can be one solid cage as well as segmented, such as two or more annular parts connected together, or several segments being connected annularly. The segments do not necessarily have to be connected to each other as they can also be of the type where segments are placed between every second roller in the roller rows. The cage can be a window shape, comb shape or any other shape known to the person skilled in the art. The central portion of the cage presents a radially inner circumferential surface and axial protrusions to separate at least two rollers in the respective first and/or second rollers rows. The bearing presents at least one first continuous annular free space confined between the first and second roller row, and between the radially inner circumferential surface of the central portion of the cage and the annular portion of the inner ring. In the case of a segmented cage where the segments are placed with some distance from each other the annular free space should be understood as being defined by the elongated pitch circle diameter of the cage segments.

By providing this bearing, the rollers can move more freely enabling the guiding of the rollers to be done more efficiently by the shape of the spherical rollers and raceways. The steering can also be done by having different friction coefficients of different parts of the roller and raceways, providing steering of the rollers substantially without skewing.

The rollers are normally separated using forcing means this to the rollers prevents the rollers moving towards each other. By forcing means is meant anything that pushes the rollers at their end face, such as a mid-flange or a steering guide ring which are well known terms for a person skilled in the art. By roller end face is meant the surface of the axial ends of the roller. Forcing means are necessary during axial forces, typically when the axial force exceeds 30% of the radial load (Fa>Fr~30%). By axial direction is meant the direction of the shaft of the bearing arrangement. By radial direction is meant the direction substantially perpendicular from the axial extension of the shaft. Forcing means are also necessary when the rotating speed exposes the rollers to centrifugal forces that press the rollers towards each other in the unloaded zones. The forcing means also come with certain drawbacks. They prevent the rollers from taking up forces optimally through the center of the roller during misalignments, which causes edge stresses and reduce load capabilities as well as life. The forcing means also causes more friction, either by that the rollers are skewed as in the case of a separate guide ring where one row of rolling element can affect the rollers in the other row, and/or as the forcing means push on the end face of the roller, such as in the case of a mid-flange.

Friction generates heat that in turn has an adverse effect on lubrication life. The service life of a bearing is often determined by the life of the lubricant, thus it is critical for the service life of a bearing not to degenerate the lubricant within. Having an inner ring flange that pushes the rollers causes strain in the flange as well as the ring that in turn have an adverse effect on bearing life. The inner ring with a mid-flange is expensive to manufacture as it needs be of good quality and designed to cope with the stresses it is exposed to, as well as not generating too much heat. An example of that is having the mid-flange and/or the ring made in a high quality material. Another example can be to subject the mid-flange to specific heat treatment processes. The mid-flange can also be designed and machined in different ways to better cope with the stresses, e.g. have a circumferential recess along the intersection between the raceway and the flange so that the corner does not carry strain and generate cracks into the ring.

The inventor has realized that forcing means are unnecessary and can be taken away in applications with low speed, solving the problems as described above. It also makes the bearing lighter and possible to manufacture with reduced cost. In the case of taking away the steering guide ring it makes the bearing easier to assemble and the bearing becomes more robust as there are fewer parts that can entangle.

By continuous annular free space is meant that the annular portion of the inner ring and the cage is not in radial contact with each other directly or by any other solid object, such as a guiding ring. The continuous annular free space can still contain oil, grease or sensors and still be considered a continuous annular free space, as long as the purpose is not to steer the cage or rollers by pushing on their end faces. By having the continuous annular free space there are possibilities to increase the size of the rollers used, thus increased the load carrying capabilities.

The annular portion is cylindrical in shape and it is formed such that the rollers in the first and second roller row can move in axial direction towards each other without being hindered by any forcing means in connection to the ring, such as an inner ring flange or a steering guide ring. The cage may though still prevent the rollers from moving towards each other to a varying degree depending on the type. The cage's pockets should though be big enough to allow movement of the rollers so that the cages central portion does not affect the rollers in the respective rows in a substantial way.

In an embodiment of the bearing arrangement the central portion of the cage presents a radially outer circumferential surface. The bearing presents a second continuous annular free space located in between the roller rows and between the radially outer circumferential surface of the central portion of the cage and the radially inner circumferential surface of the outer ring. This can be further beneficial to allow for the rollers to move freely in axial direction towards each other. The space may still be used for other things that does not take up load or obstruct the movement of the rollers or steer the cage, for instance being filled with lubricant or equipped with condition monitoring equipment, such as sensors, power generating equipment or data transmitting devices.

In an embodiment of the bearing arrangement the cage is centered by the spherical rollers, meaning the cage is only affected by the movement of the rollers and not directly by the ring's movement or through a guide ring. This is beneficial during loads that misalign the shaft where, if the cage is steered by the rings, the cage may be misaligned due to the misalignment of the rings.

In an embodiment of the bearing arrangement the spherical rollers are symmetrical. A symmetrical and asymmetrical spherical roller element is something which is well recognized by the skilled person and described in literature (e.g. Rolling Bearing Analysis by Tedric A. Harris (ISBN 0-471-79979-3). Symmetrical rollers have benefits to the load carrying capability. They can also have a positive effect to the performance of raceway guiding due to its shape, in the cases where raceway guiding is used.

In an embodiment of the bearing arrangement the spherical rollers are guided by the raceway. By having rollers guided by the raceways means that the concave shape of the raceway and the convex shape of the roller steer the roller in its axial position to optimize the load carrying capabilities. The roller and raceway can also have different friction coefficients to further enhance this feature as well as to help steer the direction of the roller to prevent skewing, thus reduce friction.

In an embodiment of the bearing arrangement the first annular free space 20 contains a lubricant, such as grease. The benefit of having the first annular free space 20 filled with lubricant is that it is located close to the raceways of the inner ring where it is mostly needed. Normally the lubricant is filled through grooves on the outside of the outer ring with passage holes into the bearing outer ring. Much of the lubricant eventually ends up in the area of the second annular free space due to gravity without much of it entering the inner ring raceways or the rollers' inner edges where the torque and friction is normally most prominent. The use of a smooth transition phase of the inner ring's radially outer circumferential surface between the spherical roller rows enables more room for lubricant to be located close to the roller edges and can be transported via the raceways to the lowest part of the second annular free space due to the force of gravity. The shape of the annular portion separating the two raceways can be formed to contain as much lubricant as possible, such as being in the form of a groove. It can also be shaped to aid the lubricant to be transported to the rollers, such as having a radially extending triangular shape pointing outwards to help the lubricant to slide to the rollers due to the force of gravity. It could also have threaded portion to transport the lubricant to the rollers due to the rotational movement of the ring.

In another embodiment the second annular free space contains lubricant in a similar way. This can be particularly beneficial to increase the bearing's life due to reduced lubricant degeneration in the case where there are limited possibilities to fill grease from the outside, for instance through the lubrication grooves on the outside of the outer ring as mentioned above. In a further embodiment both the first and the second annular free space is filled with lubricant to increase bearing and service life due to lubricant degeneration.

In an embodiment of the bearing arrangement the one of the first or the second annular free space is used for condition monitoring or power generating equipment. This is a beneficial space to be used as the equipment can be fitted within ISO standard dimension of the bearing. The area can also be beneficially used for different sensors to detect accurate sensor readings, such as sensors to detect acoustic emissions, noise, temperature, position of the rollers etc.

In an embodiment of the bearing arrangement the low speed rotating machinery rotates at a pace during normal operation so that the spherical rollers are exposed to a centrifugal force (Fc) that is less than the force of gravity (Fg). At this operating speed the use of an annular free space is mostly beneficial as no guide ring or guiding flange is needed to separate the rollers, as they are not forced together in the unloaded zone of the bearing, but kept separated due to the force of gravity and is therefore continuously steered and controlled by the raceways.

In an embodiment of the bearing arrangement the low speed rotating machinery rotates at speed less than 50 revolutions per minute (rpm). In a further embodiment the low speed rotating machinery rotates at speed less than 40 rpm, but it could also be less than 30 rpm or 20 rpm.

In an embodiment of the bearing arrangement, the low speed rotating machinery is a main shaft of a wind turbine. The inventor has realized that it is during the circumstances of a wind turbine that this inventive bearing arrangement is particularly applicable with good results. In this application the bearing arrangement is exposed to a lot of various axial and bending forces due to the force from the rotating blades and different forces applied depending on the strength of the wind. By having a cage not directly steered by anything else than the rollers, entanglement of the cage due to ring misalignment is avoided. In this application also the rotating speed is as low as required.

In an embodiment of the bearing arrangement the low speed rotating machinery is a turbine. In yet another embodiment the application is a pump.

In an embodiment of the bearing arrangement the inner ring has a side flange on the axially outer side of one of the roller rows. In another embodiment the inner ring has side flanges on the axially outer side of both the roller rows. The side flanges are beneficial to prevent the rollers from sliding out to much from its optimal positions, especially in the case where the raceways are not substantially horizontal, but has an angle leaning outwards so that the rollers may move this way due to the force of gravity. The side flange or flanges also make the bearing easier to assemble as they control the rollers' movement during the assembly process.

Bearing arrangement wherein the cage is a comb shaped cage. A comb shaped cage can both be cheaper and easier to use during the assembly process in comparison to a window type cage. The use of a comb shaped cage is particularly applicable in the case where the inner ring has side flanges to prevent the rollers from moving outwards, since the cage does not have to support in restricting that movement in any way.

In an embodiment the bearing arrangement is a one point suspension arrangement. In another embodiment the bearing arrangement is a part of a two point suspension arrangement. In yet another embodiment the bearing arrangement is a part of a 3 point suspension arrangement.

BRIEF DESCRIPTION OF THE DRAWINGS

Exemplifying embodiments will now be described more in detail with reference to accompanying drawings, wherein.

DETAILED DESCRIPTION OF THE INVENTION

Figure 1A:
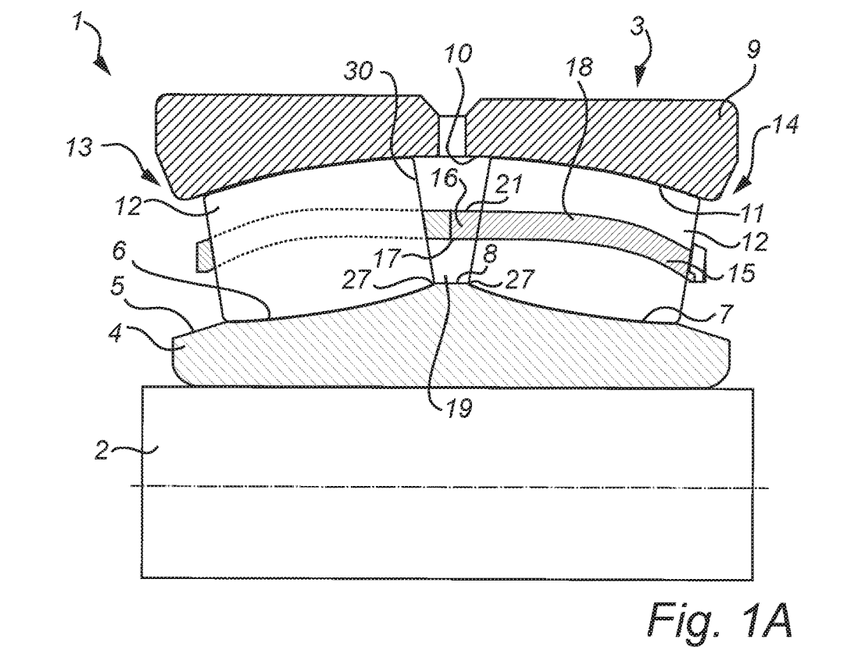
FIG. 1A shows a cross section of a bearing arrangement according to the invention.
Figure 1B:
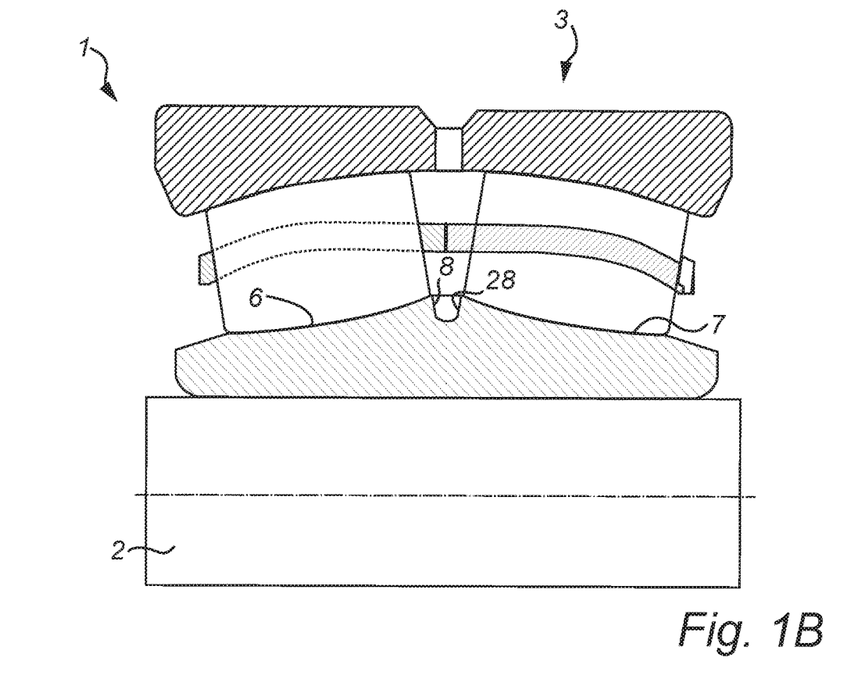
FIG. 1B shows a cross section of a bearing arrangement according to the invention.
Figure 1C:
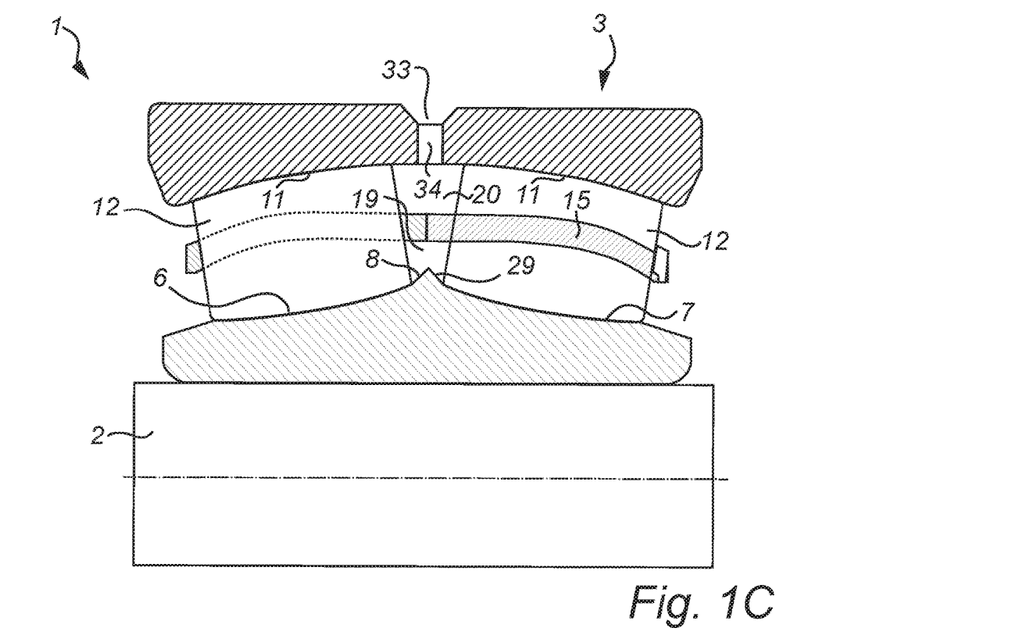
FIG. 1C shows a cross section of a bearing arrangement according to the invention.

FIG. 1A shows a cross section of a bearing arrangement 1 according to the invention. The bearing arrangement 1 provides a shaft 2 and a double row spherical roller bearing 3. An inner ring 4 presents a radially outer circumferential surface 5 with a first 6 and a second inner raceway 7 with an annular portion 8 in between. An outer ring 9 presents a radially inner circumferential surface 10 having at least one outer raceway 11. Spherical rollers 12 are arranged in a first 13 and a second roller row 14 interposed between the raceways 6, 7, 11. A cage 15 has a central portion 16 located in between the roller rows 13, 14. The central portion 16 of the cage 15 presents a radially inner circumferential surface 17 and a radially outer circumferential surface 21, as well as axial protrusions 18 to separate at least two rollers 12 in the rollers rows 13, 14. The cage 15 in the picture is a window type cage, but it could also be a comb type cage or any other type of cages that are well known for a person skilled in the art. The cage 15 can be made in one piece or divided in segments, for instance two or more annular parts mounted together as can be seen in the picture, or segments mounted together to form an annular ring. The cage segments can also be placed in between every roller pair without being connected to each other. The picture further shows a first continuous annular free space 19 confined between the first and second roller row 13, 14 and between the radially inner circumferential surface 17 of the central portion 16 of the cage 15 and the annular portion 8 of the inner ring 4. In the case of radial cage segments that are not connected to each other, the annular space is instead defined by the envisioned extended pitch circle diameter of the central portion 16 of the cage 15. The annular portion 8 is formed such that the rollers 12 in the first and second roller row 13, 14 can move in axial direction towards each other. When seen from this cross sectional perspective, the shape of the annular portion 8 is flat with rounded edges 27 where the raceways 6, 7 intersects with the annular portion 8 to avoid stresses made by a sharp edge. It could also have other shapes, such as a groove 28 or an extended raceway 29 (as shown in FIG. 1B and 1C), as long as there are no means of solid material that will affect the path of roller by pushing on its end face 30, such as a mid-flange 31 or a steering guide ring 32 (as shown in FIG. 4A or 4B). When the rollers 12 are free to move in axial direction towards each other it enables the guiding of the rollers 12 to be done more efficiently by the shape of the spherical rollers 12 and raceways 6, 7, 11. The steering can also be more efficiently done by having different friction coefficients of different parts of the roller 12 and raceways 6, 7, 11, providing steering of the rollers 12 substantially without skewing. Further it enables the rollers 12 to take up the load optimally and avoids generation of friction and strain to the rings, as would be the case if a mid-flange 31 was there, which leads to lubricant 24 degeneration and other heat generated damage to the bearing. In comparison to having a separate guide ring 32 in between the roller rows 13, 14 to guide the rollers 12 and cage 15, the situation where one row of rolling elements 13, 14 would push the guide ring which in turn will affect the other row 13, 14 of rollers 12 is avoided, preventing more friction, heat generation and damages to the raceways 6, 7, 11, such as skidding and smearing.

Figure 2A:
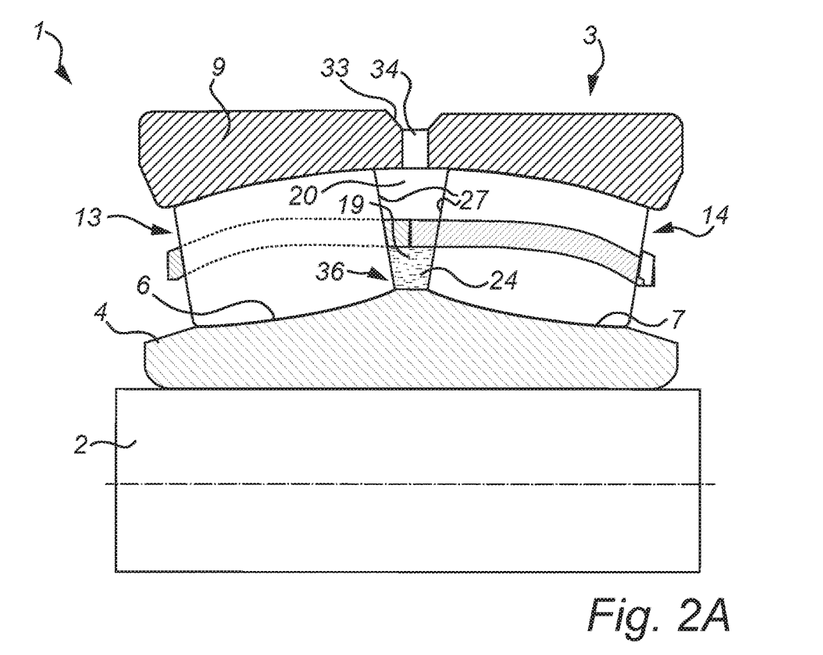
FIG. 2A shows a cross section of a bearing arrangement according to the invention.
Figure 2B:
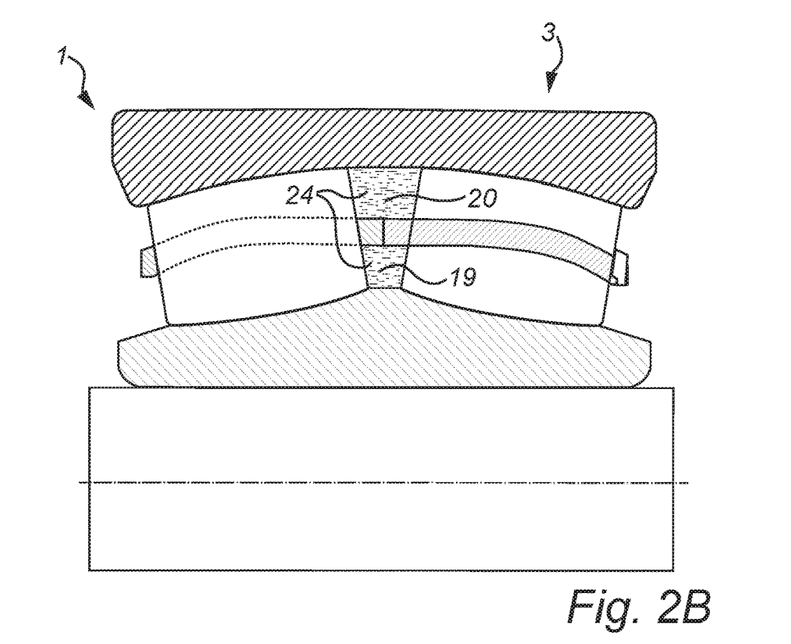
FIG. 2B shows a cross section of a bearing arrangement according to the invention.
Figure 2C:
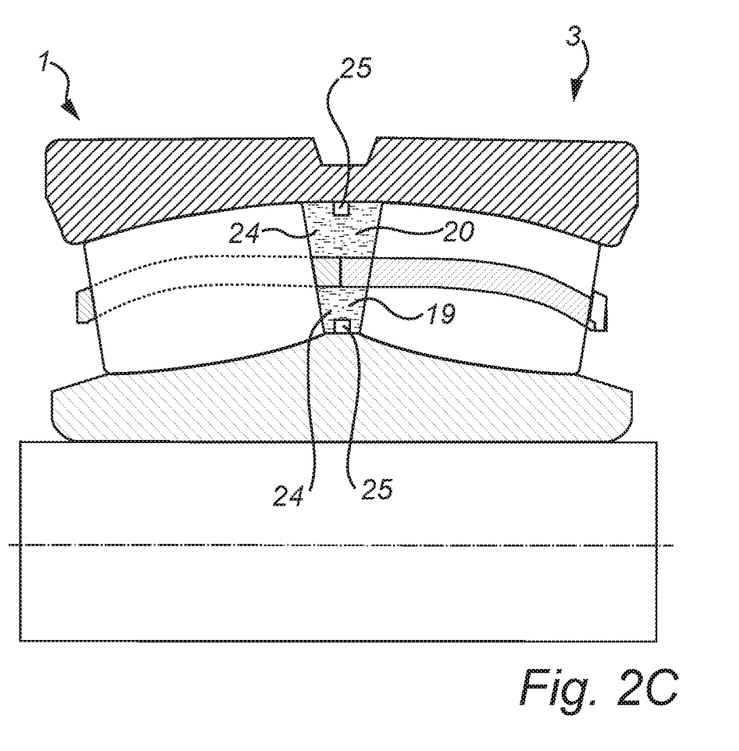
FIG. 2C shows a cross section of a bearing arrangement according to the invention.

FIG. 1B shows a cross section of a bearing arrangement 1 according to the invention. In this case the annular portion 8 is shaped into a groove 28. This is can be beneficial to fit more lubricant 24 into the bearing 3, such as oil or grease (as seen in FIGS. 2A, 2B, and 2C). This design also requires less material making the bearing lighter and cheaper to produce. The design of the groove 28 in the picture is half circular with rounded edges in the intersection to the raceways 6, 7 to avoid stresses caused by sharp edges, but it could also have any other shape, such as substantially triangular or square shape.

FIG. 1C shows a cross section of a bearing arrangement 1 according to the invention. In this case the annular portion 8 is an extended raceway 29. This enables increased contact and steering of the rollers 12 and the raceways 6, 7, 11, enabling better steering of the rollers 12 with less friction, increased load capabilities and ability to take up increased axial loads without causing edge stresses. This convex triangular shaped extension also provides better lubricant 24 flow enabling grease to flow to the inner ring raceways 6, 7 where it is needed the most as it is often where most stresses and temperatures develops as it is difficult to get lubricant 24 to this area. As can be seen from the picture, lubricant 24 can sometimes be refilled through a circumferential lubricant groove 33 on the outside of the bearing with connecting passage holes 34 into the bearing. With this method most of the lubricant 24 often gathers in the second annular free space 20 and travels to the bottom of the bearing due to the force of gravity, since it is often hindered by the cage 15 to leak into the first annular free space 19 and the inner ring raceways 6, 7 to a satisfactory extent. With this design there is room to prefill the bearing 3 with lubricant 24 (as seen in FIGS. 2A, 2B, and 2C) during assembly, especially beneficial in the first continuous annular free space 19. This lubricant 24 (as seen in FIGS. 2A, 2B, and 2C) will travel to the inner ring raceways 6, 7 of the bearing 3 where it is needed the most to a larger extent. The triangular shaped extended raceway 29 will further enable the lubricant 24 to do so due to the force of gravity. Also here the triangular shaped extended raceway 29 can have rounded top edge to avoid stresses.

Figure 1D:
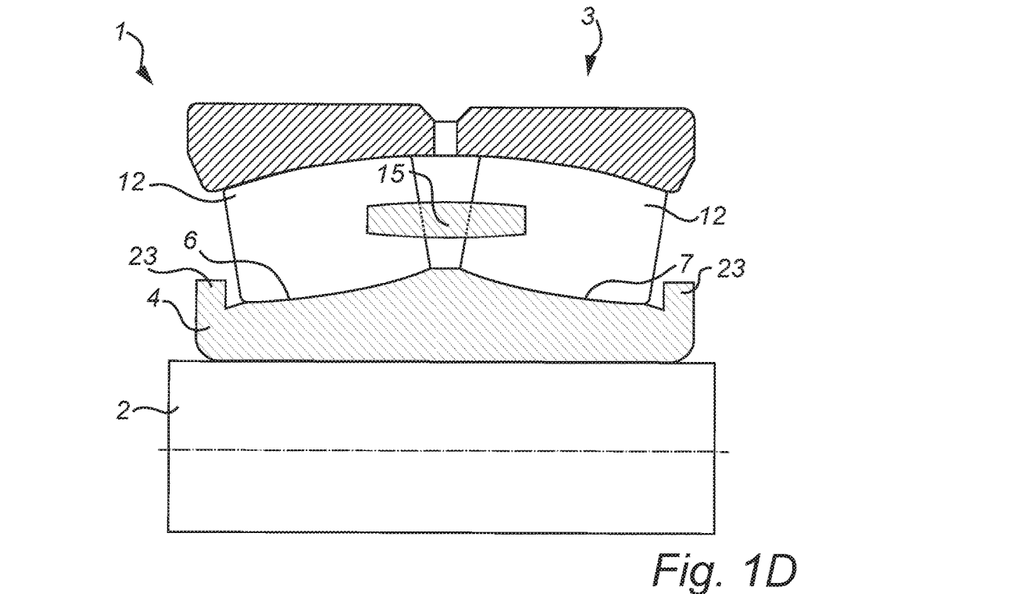
FIG. 1D shows a cross section of a bearing arrangement according to the invention.

FIG. 1D shows a cross section of a bearing arrangement 1 according to the invention. In this case the inner ring 4 has side flanges 23 and a comb shaped cage 15. The side flanges 23 are beneficial to prevent the rollers 12 from sliding out too much from its optimal positions in the case where the inner ring raceways 6, 7 are not substantially horizontal, but instead have an angle leaning outwards so that the rollers 12 may move this way due to the force of gravity. The side flanges 23 also make the bearing 3 easier to assemble as they control the rollers' 12 movement during the assembly process. The picture shows side flanges 23 on both sides, but it could also be on only one side. The figure further shows a comb shaped cage 15. The use of a comb shaped cage 15 is particularly applicable in the case where the inner ring 4 has side flanges 23 to prevent the rollers 12 from moving outwards, since the cage 15 does not have to support in restricting that movement in any way.

FIG. 2A shows a cross section of a bearing arrangement 1 according to the invention. The first continuous annular free space 19 is filled with lubricant 24, such as oil or grease. The benefit of having the first continuous annular free space 19 filled with lubricant 24 is that it is located close to the raceways 6, 7 of the inner ring 4 where it is mostly needed. Normally the lubricant 24 is filled through lubrication grooves 33 on the outside of the outer ring 9 with passage holes 34 through the bearing outer ring 9. Much of the lubricant 24 eventually ends up in the area of the intended second continuous annular free space 20 due to gravity without much of it entering the raceways 6, 7 through rollers' 12 inner edges where the torque and friction is normally most prominent. The use of a smooth transition phase 36 without the need of a mid-flange 31 or a steering guide ring 32 (FIG. 4A, 4B) between the roller rows 13, 14 enables more room for lubricant 24 to be located close to the inner roller end faces 27 and can be transported via the inner ring raceways 6, 7 to the lowest part of the second continuous annular free space 20 due to the force of gravity. The shape of the annular portion 8 separating the two raceways 6, 7 can be formed to contain as much lubricant 24 as possible, such as being in the form of a groove (FIG. 1B). It can also be shaped to aid the lubricant 24 to be transported to the rollers 12, such as having a radially extending triangular shape pointing outwards to help the lubricant 24 to slide to the rollers 12 due to the force of gravity (FIG. 1C).

FIG. 2B shows a cross section of a bearing arrangement 1 according to the invention. Here also the second continuous annular free space 20 is used for lubricant 24 in a similar way as the first annular free space 19 in FIG. 2A. This can be particularly beneficial in the case where there are limited possibilities to fill lubricant 24 from the outside to increase the amount of lubricant 24 inside the bearing 3. This will increase bearing life and need of service due to lubricant 24 degeneration.

FIG. 2C shows a cross section of a bearing arrangement 1 according to the invention. Here the first and/or the second continuous annular free space 19, 20 are used for condition monitoring equipment 25. The equipment can be anything related, but not limited, to sensors, power generation, data transmission or a combination thereof. This is a beneficial space to be used as the equipment can be fitted within ISO standard dimension of the bearing 3. The area can also be beneficially used for different sensors to detect accurate sensor readings, such as sensors to detect acoustic emissions, noise, vibration, temperature, position of the rollers 12 as a few examples. The drawing shows the bearing 3 equipped with condition monitoring equipment 25 in combination with being lubricated as described in FIG. 2A and 2B, enjoying the benefits of increased lubricant life as well as better condition monitoring.

Figure 3:
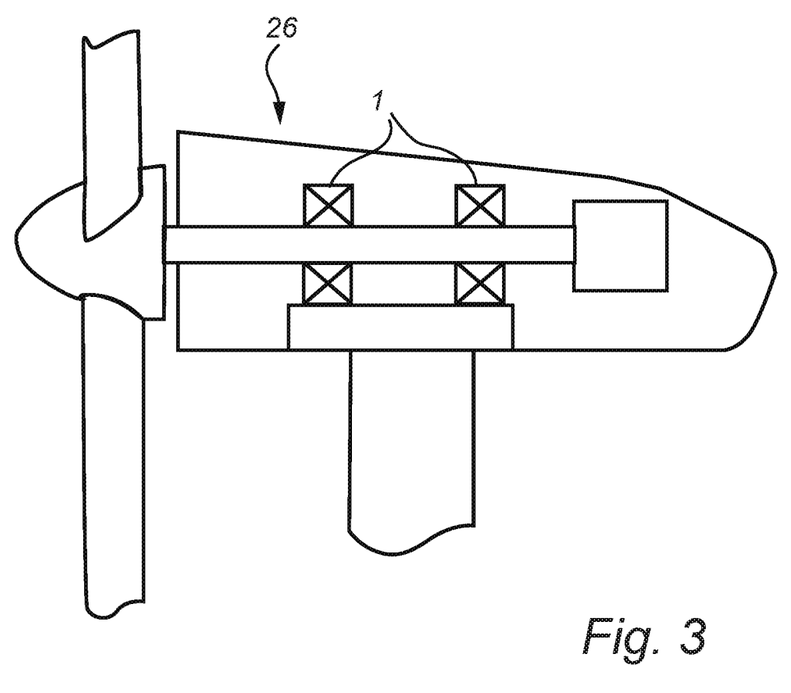
FIG. 3 shows a wind turbine having the bearing arrangement according to the invention.

FIG. 3 shows a wind turbine 26 providing the bearing arrangement 1. The inventor has found that is during these circumstances that this bearing arrangement 1 is particularly suitable. The main shaft 2 rotates at a pace during normal operation so that the spherical rollers 12 are exposed to a centrifugal force (Fc) that is less than the force of gravity (Fg) also in the unloaded zone. At this operating speed the use of continuous annular free spaces 19, 20 is mostly beneficial as no guide ring or guiding flange is needed to separate the roller rows 13, 14 from each other, as they are not forced together in the unloaded zone of the bearing 3, but kept separated due to the force of gravity and is therefore continuously steered and controlled by the raceways 6, 7, 11. When the bearing arrangement 1 is used to support the main shaft of the wind turbine 26 the bearing 3 is exposed to a lot of various axial and bending forces due to the force from the rotating blades and different forces applied depending on the strength of the wind. By having a cage 15 not directly steered by anything else than the rollers 12, entanglement of the cage 15 due to ring misalignment is avoided.

In an embodiment of the bearing arrangement 1 the low speed rotating machinery 22 rotates at a speed less than 50 revolutions per minute (rpm). In a further embodiment the low speed rotating machinery 22 rotates at speed less than 40 rpm, but it could also be less than 30 rpm or 20 rpm.

Although the present invention has been described according to a number of preferred embodiments, yet the examples given are not exhaustive. It will be appreciated by those skilled in the art that additions, deletions, modifications, and substitutions not specifically described herein may be made without departing from the invention as defined in the appended claims.

LIST OF REFERENCE NUMBERS

1. Bearing arrangement
2. Shaft
3. Double row spherical roller bearing
4. Inner ring
5. Radially outer circumferential surface
6. First inner raceway
7. Second inner raceway
8. Annular portion
9. Outer ring
10. Radially inner circumferential surface (Ring)
11. Outer raceway
12. Spherical rollers
13. First roller row
14. Second roller row
15. Cage
16. Central portion
17. Radially inner circumferential surface (Cage)
18. Axial protrusions
19. First continuous annular free space
20. Second continuous annular free space
21. Radially outer circumferential surface (Cage)
22. Low speed rotating machinery
23. Side flange
24. Lubricant
25. Condition monitoring equipment
26. Wind turbine
27. Rounded edges
28. Groove
29. Extended raceway
30. Roller end face
31. Mid-flange
32. Steering guide ring
33. Lubricant groove
34. Passage holes
36. Smooth transition phase
37. Inner roller end face

The invention claimed is:

1. A bearing arrangement for low speed rotating machinery, the bearing arrangement comprising:
a shaft,
at least one double row spherical roller bearing supporting the shaft, the at least one bearing having:
an inner ring providing a radially outer circumferential surface having a first inner raceway and a second inner raceway and an annular portion separating the first inner raceway and the second inner raceway in an axial direction, when viewed in radial cross section the annular portion defines an annular groove therein, the annular groove having a semicircular shape and a first groove edge and a second groove edge which abut the first inner raceway and the second inner raceway respectively, the first groove edge meeting the first inner raceway to form a first rounded edge, the second groove edge meeting the second inner raceway to form a second rounded edge,
an outer ring providing a radially inner circumferential surface having at least one outer raceway,
spherical rollers arranged in a first roller row and a second roller row, the first roller row and the second roller row being disposed between the at least one outer raceway and the first inner raceway and the second inner raceway,
at least one cage having a central portion located between the first roller row and the second roller row, the central portion includes a radially inner circumferential surface and axial protrusions to separate at least two rollers in the at least one of the first roller row and second roller row, wherein
the bearing provides a first continuous annular free space confined between the first roller row and the second roller row and between the radially inner circumferential surface of the central portion of the at least one cage and the annular portion of the inner ring,
the annular portion is formed such that the rollers in the first roller row and second roller row can move in the axial direction towards each other.

2. The bearing arrangement according to claim 1, wherein the central portion of the cage provides a radially outer circumferential surface, and wherein the bearing provides a second continuous annular free space located between the roller rows and between the radially outer circumferential surface of the central portion of the cage and the radially inner circumferential surface of the outer ring.

3. The bearing arrangement according to claim 1, wherein the cage is centered by the spherical rollers.

4. The bearing arrangement according to claim 2, wherein one of the first continuous annular free space and the second continuous annular free space includes condition monitoring equipment.

5. The bearing arrangement according to claim 2, wherein one of the first continuous annular free space and the second continuous annular free space provides a location for receiving lubricant in the bearing arrangement.

6. The bearing arrangement according to claim 1, wherein the spherical rollers are symmetrical.

7. The bearing arrangement according to claim 1, wherein the spherical rollers are guided by the raceways.

8. The bearing arrangement according to claim 1, wherein the low speed rotating machinery rotates at a speed during normal operation exposing the spherical rollers to a centrifugal force (Fc) that is less than the force of gravity (Fg).

9. The bearing arrangement according to claim 1, wherein the low speed rotating machinery rotates at speed less than 50 revolutions per minute.

10. The bearing arrangement according to claim 1, wherein the shaft is a main shaft of a wind turbine.

11. The bearing arrangement according to claim 1, wherein the inner ring presents a side flange on the axially outer side of at least one of the roller rows.

12. The bearing arrangement according to claim 1, wherein the cage is a comb shaped cage.

* * * * *